United States Patent [19]

Kydd

[11] Patent Number: 4,483,631
[45] Date of Patent: Nov. 20, 1984

[54] MULTIPLE THERMOCOUPLE SYSTEM FOR HIGH TEMPERATURE REACTORS

[75] Inventor: Paul H. Kydd, Lawrenceville, N.J.

[73] Assignee: HRI, Inc., Gibbsboro, N.J.

[21] Appl. No.: 404,181

[22] Filed: Aug. 2, 1982

[51] Int. Cl.³ .................. G01K 7/08; G08B 29/00; G06F 15/46
[52] U.S. Cl. .................. 374/141; 340/870.17; 364/557; 374/167; 374/179; 376/247
[58] Field of Search .............. 374/110, 101, 166, 167; 307/117; 340/870.17, 518; 376/247; 364/178

[56] References Cited

U.S. PATENT DOCUMENTS

| | | | |
|---|---|---|---|
| 2,003,681 | 6/1935 | Doyle | 340/870.17 X |
| 2,015,838 | 10/1935 | Borden et al. | 340/870.17 X |
| 2,731,627 | 1/1956 | Herbst | 374/166 X |
| 3,077,775 | 2/1963 | Hoffman | 374/167 |
| 3,192,770 | 7/1965 | Bash | 374/166 X |
| 3,459,925 | 8/1969 | Goosey et al. | 374/167 X |
| 3,688,293 | 8/1972 | Sullivan | 340/521 |
| 3,798,624 | 3/1974 | Baxter et al. | 364/178 |
| 3,810,138 | 5/1974 | Thompson et al. | 376/247 X |
| 3,921,453 | 11/1975 | Platzer, Jr. | 307/117 X |
| 4,008,049 | 2/1977 | Clemmer et al. | 374/111 X |

Primary Examiner—Daniel M. Yasich
Attorney, Agent, or Firm—Fred A. Wilson

[57] ABSTRACT

A multiple thermocouple system for rapidly monitoring wall temperatures of a metal vessel and identifying those thermocouples having voltages and temperature readings above a predetermined level. In the system, a number of first metal insulated conductor wires are metal bonded to the metal vessel to provide hot first junctions, and a second conductor utilizes the vessel metal wall as a portion of the conductor together with an additional metal insulated conductor wire connected to the metal wall. The conductors of each thermocouple pair are connected to the terminals of a rapid switching device and subsequently connected by the switching device to a voltage measuring means, which can be a digital readout type millivoltmeter. If desired, the voltage output of each thermocouple pair can be compared by a computer with the voltage output from a conventional dual conductor reference thermocouple attached to the vessel wall to determine temperature deviations. Also, the voltage readout for those thermocouples showing temperature deviations exceeding a predetermined amount can be conveniently displayed on a cathode ray tube screen.

12 Claims, 3 Drawing Figures

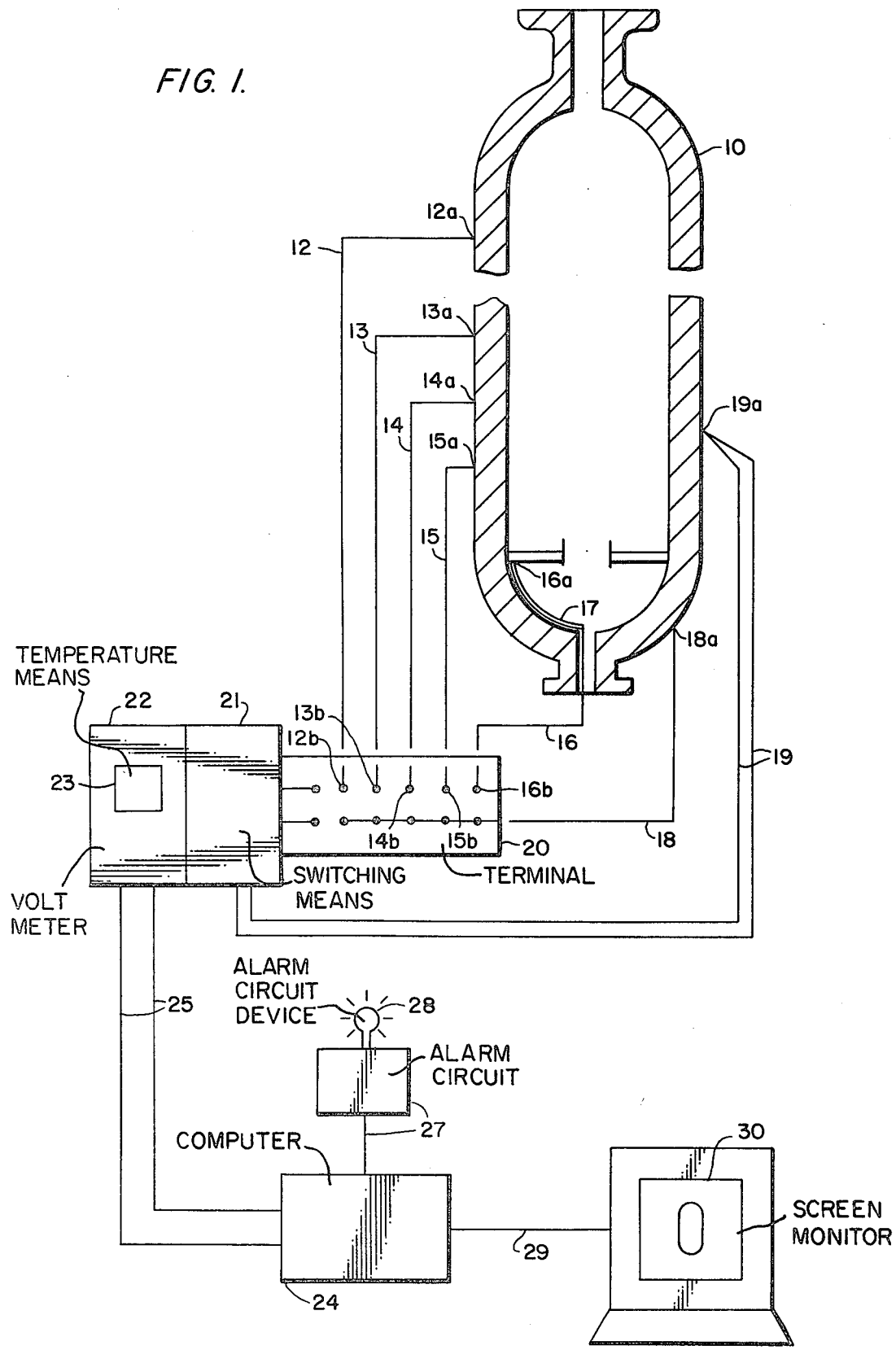

MULTIPLE THERMOCOUPLE SYSTEM FOR HIGH TEMPERATURE REACTORS

BACKGROUND OF INVENTION

This invention pertains to a multiple thermocouple system used for frequently monitoring the temperatures of a metal vessel wall. It pertains particularly to a thermocouple system in which a first conductor wire is attached to a vessel wall and the vessel wall provides a portion of the second conductor of the thermocouple, and both conductors are connected to switching means and to a voltmeter.

With the advent of digital computers that are relatively cheap, it is now possible to monitor much greater amounts of data automatically than was previously possible for information purposes and also for safety purposes. A common problem for which this capability would be of great value is monitoring high pressure, high temperature reactors in which local overheating of the wall can lead to failure and must be prevented. Heretofore, it has been very expensive to install and monitor thermocouples, with costs being approximately $1,500 per thermocouple. However, with the advent of modern data acquisition systems using digital computers, it is possible to scan and monitor very large numbers of thermocouples very economically, particularly if all that is required is to activate an alarm if the temperature rises above a given value.

Multiple thermocouple systems for the rapid measurement of temperatures such as in reactors have been developed previously. For example, U.S. Pat. No. 3,459,925 to Goosey, et al discloses a system for rapidly scanning a large number of conventional type dual conductor thermocouples. Also, U.S. Pat. No. 4,008,049 to Clemmer, et al discloses apparatus for measuring peak temperatures within a tubular type reactor, also using conventional dual conductor type thermocouples. However, because these temperature monitoring systems utilize conventional dual conductor thermocouples, their cost per thermocouple are undesirably greater than that for the thermocouple system of the present invention.

SUMMARY OF INVENTION

The present invention provides a thermocouple system for rapidly monitoring wall temperatures of a metal vessel. The thermocouple system comprises at least one single first conductor thermocouple wire metal bonded to a reactor wall, usually on a narrow spacing from an adjacent single thermocouple wire. Each first thermocouple metal conductor wire is attached at one end to a first junction point on a surface of a metal vessel and is attached at the other end to a terminal means and a switching means arranged to connect the conductor wire to a voltage measuring means, the first conductor being composed of a metal different from that of the vessel. Also, a second thermocouple conductor wire is provided spaced from said first thermocouple conductor wire and composed of a metal similar to that of said vessel and attached at one end to a second junction point on said vessel and attached at the other end to a terminal and a switching means. The voltage measuring means is connected to said switching means for indicating a small electrical voltage generated in each thermocouple conductor pair consisting of said first conductor wire and the second conductor wire to indicate a voltage difference and corresponding wall temperature at said first junction point. Thus, each thermocouple pair consists of a first conductor wire such as constantan bonded to the vessel, and a second conductor which uses the vessel wall itself as a portion of the other conductor.

All of the first conductor wires are electrically insulated from each other and are brought to a common terminal and switching means such as a multiplexing switch. At this switching point, the voltage inputs from all the thermocouples are scanned by a voltmeter, and are compared with a master thermocouple reading the temperature of the reactor wall at some chosen position representative of the entire reactor temperature. An alarm circuit can be actuated if one or more of these thermocouple pairs goes significantly higher in millivolt reading than the reference thermocouple, or the average of all thermocouples. In this way, if a local hot spot occurs in the vessel wall, an alarm will be sounded, or an automatic reactor shutdown procedure can be initiated.

The advantage of this thermocouple system is that it is possible to economically monitor the entire wall of a high temperature reactor vessel continuously to insure that if a hot spot develops in the reactor, the operators are made aware of it and the reaction process can be shut down safely.

BRIEF DESCRIPTION OF DRAWINGS

FIG. 1 is a schematic diagram of a multiple thermocouple system connected to a wall of a metal vessel in accordance with the invention.

DETAILED DESCRIPTION OF INVENTION

Figure 2A:
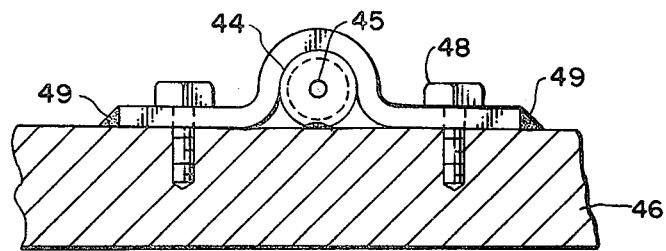
FIGS. 2a and 2b is a sectional view showing single wire thermocouples useful in the invention.

Various degrees of sophistication can be built into the thermocouple monitoring circuits, such that adjacent thermocouples can be compared to determine if the wall hot spots are spreading, thereby eliminating false alarms. One could accomplish the same result by installing double thermocouples at each position and comparing the signal between the thermocouples to eliminate any defective thermocouples. A thermocouple system of this type would permit operation of high temperature reactors more efficiently and with less internal thermal insulation without sacrificing reactor safety. In fact, reactor safety would be improved by insuring that there was continuous and redundant monitoring of critical wall temperatures.

In H-Oil ® and H-Coal TM processes, for example, such a multiple thermocouple installation could be used to monitor reactor temperatures everywhere and permit safe operation with thinner internal insulation. Alternatively, the system could permit the use of lower temperature rating alloy steels in a reactor without having to use higher quality materials in the reactor wall to allow for possible insulation failure. The economic returns on this type of thermocouple installation are considerable, in addition to the improved safety that would be realized.

The thermocouple system of the present invention is generally shown in FIG. 1, in which a reactor vessel 10 which has steel alloy walls which are usually operated at a temperature within a range of about 400°–1800° F. A plurality of single conductor wires 12, 13, 14, 15, etc. of constantan alloy are rigidly attached and metal bonded at one end to the reactor metal wall at spaced intervals, such as by mechanical clamping and soldering or welding to provide a first or hot junction point 12a, 13a, 14a, 15a, etc. attached to the metal wall. Each conductor wire is also attached by a suitable electrical connection at its other end 12b, 13b, 14b, 15b, etc., to a terminal 20 of a rapid switching device 21. If desired, one or more single wire conductors 16 can also be similarly connected to critical structures, such as 16a within the reactor and mechanically protected by jacket 17 so as to monitor such internal temperatures also.

A second thermocouple wire 18 is also rigidly attached at one end 18a to the wall of reactor 10 by metal bonding, and usually also by mechanical clamping the thermocouple sheath for protection to the joint, to provide a second junction point. Conductor wire 18 is electrically attached at its other end 18b to terminal 20 of switching device 21. By this arrangement, any one of the first conductor wires is connected with the second conductor wire 18 to provide a thermocouple pair for monitoring the temperature at each first junction point.

The function of switching device 21 is to sequentially connect each of the first thermocouple conductors 12, 13, 14, 15, etc. with the second thermocouple conductor wire 18, and then to a digital mill-voltmeter 22 for measuring the voltage generated in each thermocouple conductor pair due to the temperature difference between any one of the first junction points and the terminal 20 and displaying the thermocouple reference numbers and temperatures on a meter 23. The connections between the multiplexing switching means 21 and voltmeter 22 are usually made by copper wire conductors.

As each thermocouple conductor pair is connected sequentially with the milli-voltmeter 22, the voltages are monitored through conductors 25 by a digital computer 24 and also compared either with the adjacent thermocouple or with a reference thermocouple 19 attached to the vessel wall at point 19a for which the temperature is relatively stable. Any deviation in temperature difference exceeding a predetermined value will cause an alarm circuit 27 and device 28 to be activated so as to call the attention of the operator personnel to the excessive temperature deviation in the reactor. An example of the operation of one known alarm circuit is shown by U.S. Pat. No. 2,731,627.

As an alternative preferred arrangement of the invention for displaying the location and magnitude of any temperature deviations, a cathode ray tube screen monitor 30 can be provided connected to digital computer 24. An important part of this hermocouple system instrumentation could be cathode ray tube rapid display of the temperature data. The display could consist of a depiction of the cathode ray tube screen of the developed surface of the reactor so that the entire wall could be observed at once. Two modes of temperature data display would be especially useful and effective:

1. Colorgraphic Display. In this display mode the thermocouple temperature readings are converted into color signals. Individual thermocouples control the color for a segment of a raster line equal to the portion of circumference of the vessel monitored by the thermocouple. The number of raster lines are at least equal to the number of thermocouples on the vessel. Also, to produce a more representative picture and to make hot spots more visible, several adjacent lines could repeat the same data. Increasing temperature could register in sequence as black, violet, blue, green, red, yellow and white. The display would be adjusted so that the design or normal temperature is represented by the color green. In this way, normal operation temperatures appear safe and hot spots appear in the colors associated with overheating to various degrees as indicated by the different colors.

2. Exception Display. In this display mode the thermocouple readings can be displayed in numerical form on a monochrome monitor. It would be possible to display every temperature on a diagramtic representation of the reactor skin, but a more meaningful display would be obtained if only those temperatures exceeding the average by some preselected amount were displayed along with the average temperature. This could be achieved by formatting a table in which thermocouple locations are represented by individual matrix elements. Locations off the vessel or without thermocouple readings would be represented by zeros. All temperatures are scanned periodically, the excessively low ones rejected, and the average temperature is calculated and displayed. A rescan of the stored data identifies those thermocouples reading higher than average by the specified amount. All other temperatures are set to zero, and the table displayed highlights any hot spots and gives the measured temperatures of the hot spots.

Figure 2B:
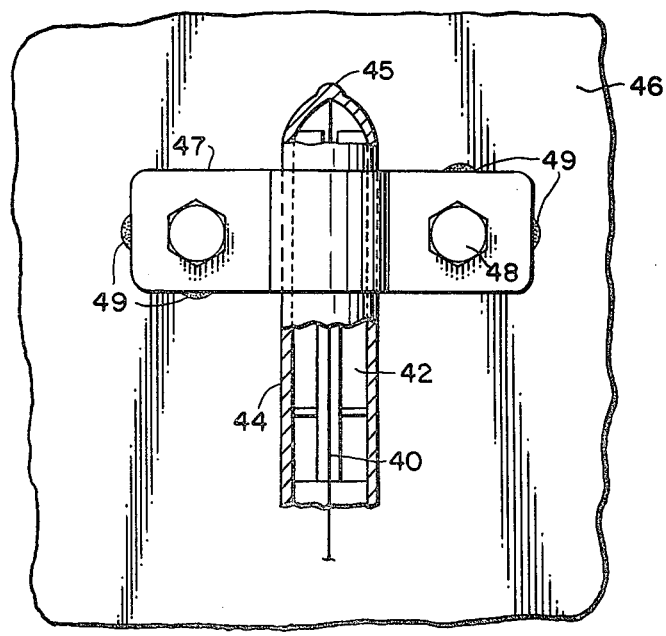

A typical thermocouple construction for high temperature service is shown in FIGS. 2a and 2b, in which a single constantan conductor wire 40 is surrounded by a ceramic insulation material 42, and both items inserted into a metal sheath 44. The tip end 45 of the constantan wire and metal sheath 44 is electrically attached to the surface of the reactor wall 46 by soldering or welding, and mechanically attached to the wall by a suitable clamp 47 either by fasteners 48 or by spot welding at 49. Alternatively, if desired, sheath 44 can be inserted into a hole in the reactor wall and retained therein by suitable threaded fittings attached to the reactor wall (not shown).

Although this invention has been described broadly and with reference to certain preferred embodiments thereof, it will be understood that modifications and variations of the thermocouple system and method for use can be made within the spirit and scope of the invention, which is defined by the following claims.

I claim:

1. A thermocouple system for rapidly monitoring wall temperatures of a metal vessel, comprising:

(a) a thermocouple metal conductor wire attached at one end of a first junction point on a metal vessel and attached at the other end to a switching device arranged to connect said conductor wire to a voltage measuring means said first conductor wire being composed of a metal different from that of said vessel; and (b) a second thermocouple conductor wire spaced from said first thermocouple conductor wire and composed of a metal similar to that of said vessel and attached at one end to a second junction point on said vessel and attached at the other end to a common terminal of said switching device, said voltage measuring means being connected to said switching means sequentially for indicating a small electrical voltage generated in each thermocouple conductor pair consisting of said first conductor wire and said second conductor wire to indicate a voltage difference and corresponding wall temperature at said first junction point and means for processing said small electrical voltage indicated and for comparing said voltage with another voltage generated from a reference thermocouple means attached to a point on said metal vessel where the temperature is stable.

2. The thermocouple system of claim 1, wherein the material of said first thermocouple metal conductor wire is constantan alloy and said second conductor includes a portion of the metal vessel wall composed of a steel alloy material.

3. The thermocouple system of claim 1, wherein said second thermocouple conductor wire is a steel alloy wire connected to said vessel at said second junction point.

4. The thermocouple system of claim 1, wherein the temperature indicated by each thermocouple pair is compared to that indicated by a reference thermocouple attached to said vessel wall, and any temperature deviation between the two thermocouples is indicated by said voltage measuring means.

5. The thermocouple system of claim 1, wherein a plurality first thermocouple conductor wires are provided and each thermocouple pair is monitored at time intervals of 10-30 seconds and the voltage compared to that from a reference thermocouple attached to said vessel, and if the voltage of any thermocouple exceeds that of the reference thermocouple by a predetermined amount an alarm circuit is activated.

6. The thermocouple system of claim, 1, wherein the vessel wall temperatures monitored are between 400° and 1800° F.

7. The thermocouple system of claim 6, wherein said first thermocouple conductor wire is enclosed in a metallic sheath and is electrically insulated from the sheath by a ceramic material.

8. The thermocouple system of claim 1, wherein the voltage measuring means is a digital type milli-voltmeter which provides a temperature readout.

9. The thermocouple system of claim 1, wherein said second conductor wire is composed of essentially the same material as the metal vessel.

10. The thermocouple system of claim 1, wherein said thermocouples for which the voltage and corresponding temperature readings exceed the average temperature by a predetermined amount are displayed on a cathode ray tube screen along with their respective temperature readings.

11. The thermocouple system of claim 1, wherein the voltage from the thermocouples for which the voltage exceeds the average by a predetermined amount is displayed graphically in contrasting colors on a screen of a cathode ray tube.

12. A thermocouple system for rapidly monitoring temperatures of a metal vessel, comprising:
(a) five first thermocouple constantan conductor wires electrically insulated and attached at one end to a first junction point on a steel vessel and attached at their other ends to a common terminal means;
(b) a second thermocouple conductor wire composed of substantially the same metal as said vessel and attached at one end to a second junction point on said vessel spaced from said first junction point and attached at the other end to said terminal means; and
(c) switching device for connecting any one of said first conductor wires and said second conductor wire from said terminal means to a voltage measuring means; wherein said voltage measuring means sequentially indicates a small electrical voltage generated in each thermocouple conductor pair consisting of said first conductor wire and said second conductor wire to indicate a voltage difference and corresponding temperature at said first junction point and means for processing said small electrical voltage indicated and for comparing said voltage with another voltage generated from a reference thermocouple means attached to a point on said metal vessel where the temperature is stable.

* * * * *